US008186723B2

(12) United States Patent
Kim

(10) Patent No.: US 8,186,723 B2
(45) Date of Patent: May 29, 2012

(54) PIPE FIXING SYSTEM AND PIPE FASTENING DEVICE

(75) Inventor: Suk-Yoon Kim, Incheon (KR)

(73) Assignee: Weduss Co., Ltd, Chungcheongbuk-Do (KR)

( * ) Notice: Subject to any disclaimer, the term of this patent is extended or adjusted under 35 U.S.C. 154(b) by 610 days.

(21) Appl. No.: 12/304,659

(22) PCT Filed: Jun. 13, 2006

(86) PCT No.: PCT/KR2006/002236
§ 371 (c)(1),
(2), (4) Date: Dec. 12, 2008

(87) PCT Pub. No.: WO2007/145383
PCT Pub. Date: Dec. 21, 2007

(65) Prior Publication Data
US 2009/0127849 A1    May 21, 2009

(51) Int. Cl.
*F16L 19/07* (2006.01)
*F16L 21/06* (2006.01)

(52) U.S. Cl. ........ 285/342; 285/104; 285/323; 285/339; 285/404

(58) Field of Classification Search .............. 285/34, 285/35, 323, 404, 104, 339, 342
See application file for complete search history.

(56) References Cited

U.S. PATENT DOCUMENTS

| | | | | |
|---|---|---|---|---|
| 2,197,450 A * | 4/1940 | Curtis | ............ | 285/369 |
| 2,647,769 A * | 8/1953 | Smith | ............ | 285/148.6 |
| 2,832,615 A * | 4/1958 | Summers | ............ | 285/342 |
| 3,127,198 A * | 3/1964 | Orund | ............ | 285/123.6 |
| 4,127,289 A * | 11/1978 | Daspit | ............ | 285/322 |
| 4,330,143 A * | 5/1982 | Reneau | ............ | 285/322 |
| 4,427,218 A * | 1/1984 | Duvet et al. | ............ | 285/184 |
| 5,299,644 A * | 4/1994 | Eckert | ............ | 166/379 |
| 6,592,153 B1 * | 7/2003 | Belcher | ............ | 285/222.2 |
| 7,293,758 B2 * | 11/2007 | Hsueh-Feng | ............ | 251/149.7 |

FOREIGN PATENT DOCUMENTS

| JP | S51-151230 | 12/1976 |
|---|---|---|
| KR | 20-0325868 | 9/2003 |
| KR | 1020060087981 | 8/2006 |

* cited by examiner

*Primary Examiner* — James Hewitt
(74) *Attorney, Agent, or Firm* — IPLA P.A.; James E. Bame

(57) ABSTRACT

A pipe fixing system comprises a cylindrical body having a tapering part whose diameter is smaller as it goes towards the top of the body; an entry provided in the body and having a bolt hole and a projection; a fixing chip provided in the tapering part, having, in the center, a bolt hole extending from the top to the bottom of the chip and having teeth on the surface contacting a pipe; and a bolt passing through the bolt hole of the entry and that of the fixing chip. A a spring recess and a bolt end are provided on lower part of the bolt and a spring is provided in the spring recess to prevent unintentional movement of the bolt.

10 Claims, 14 Drawing Sheets

[Figure 1]
Prior Art
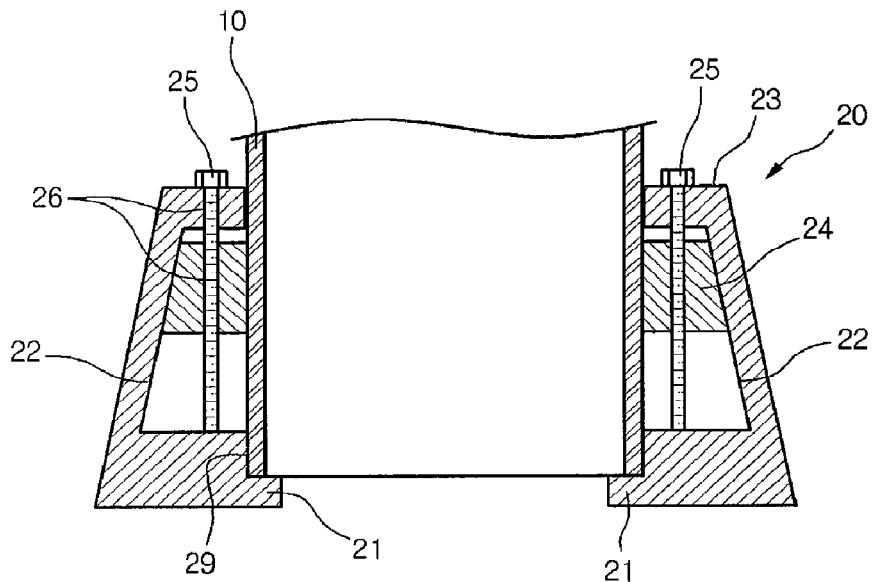
[Figure 2]
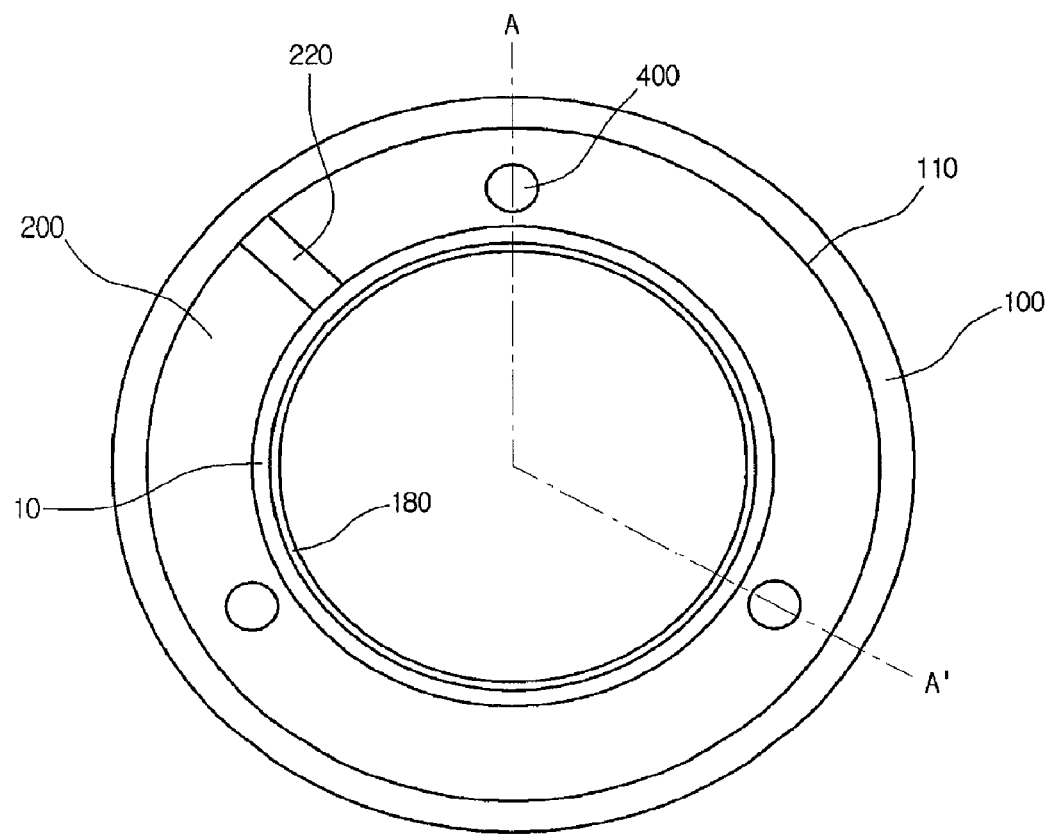

[Figure 3]
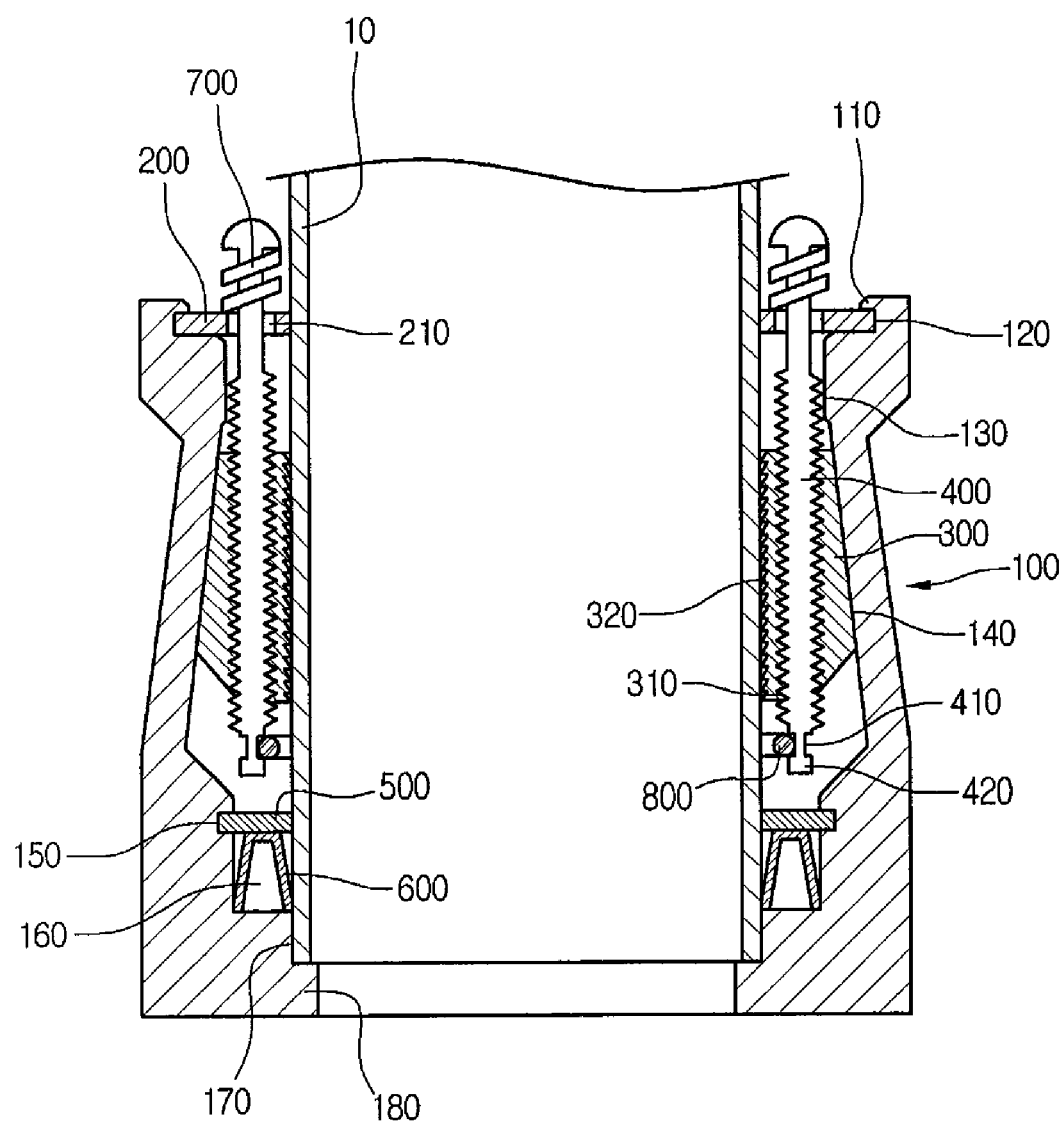

[Figure 4]
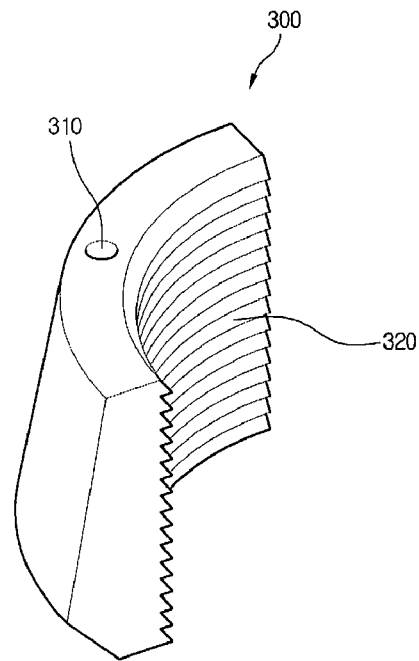
[Figure 5]
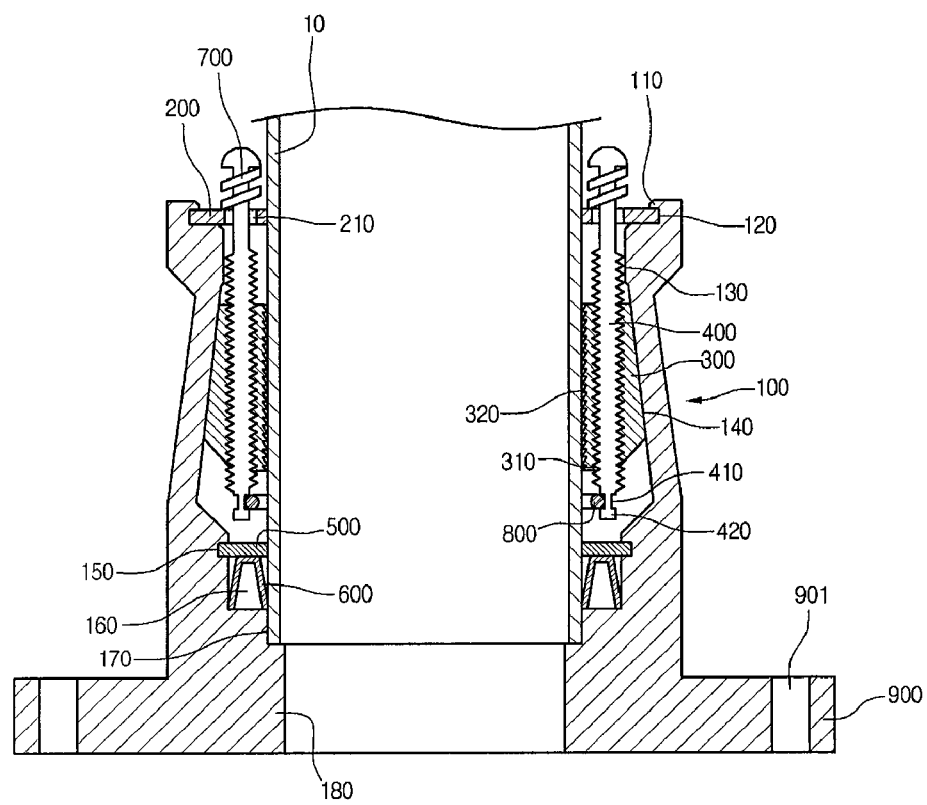

[Figure 6]
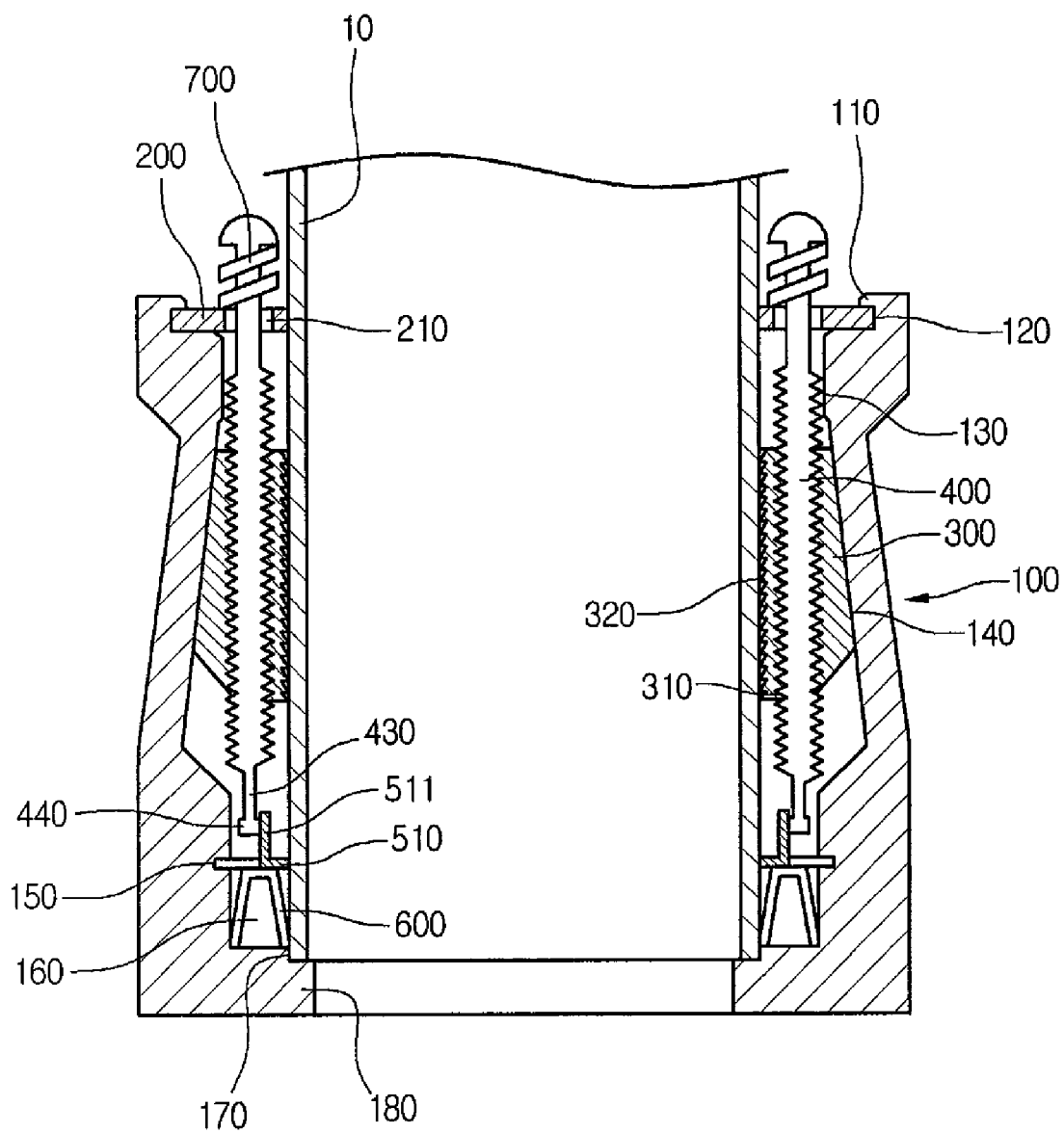

[Figure 7]
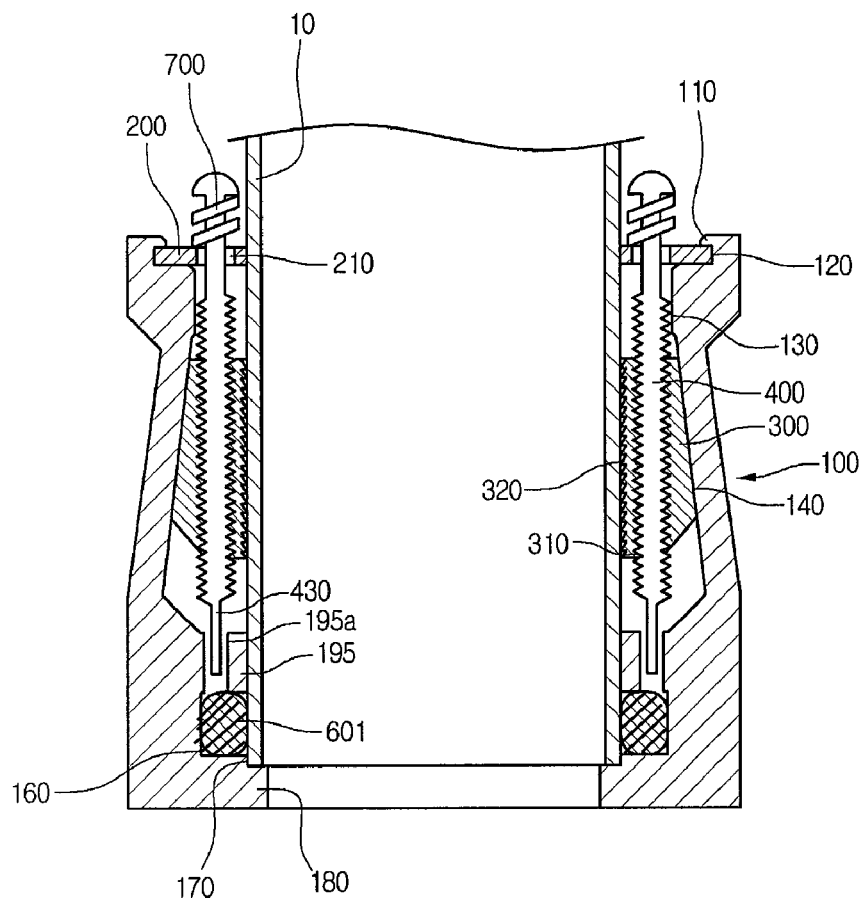
[Figure 8]
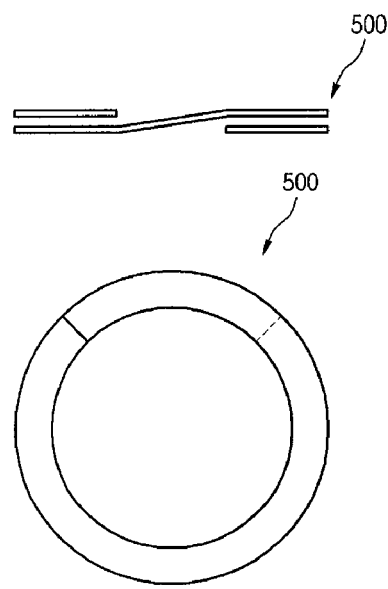

[Figure 9]
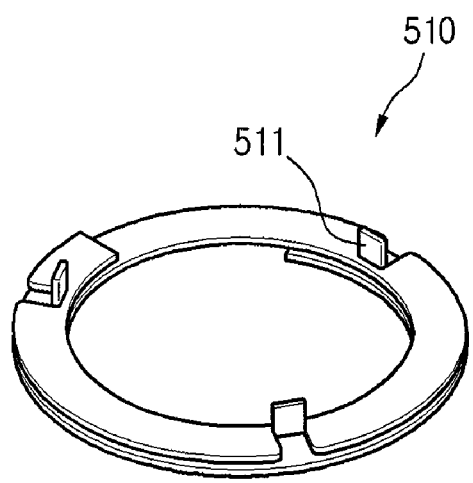
[Figure 10]
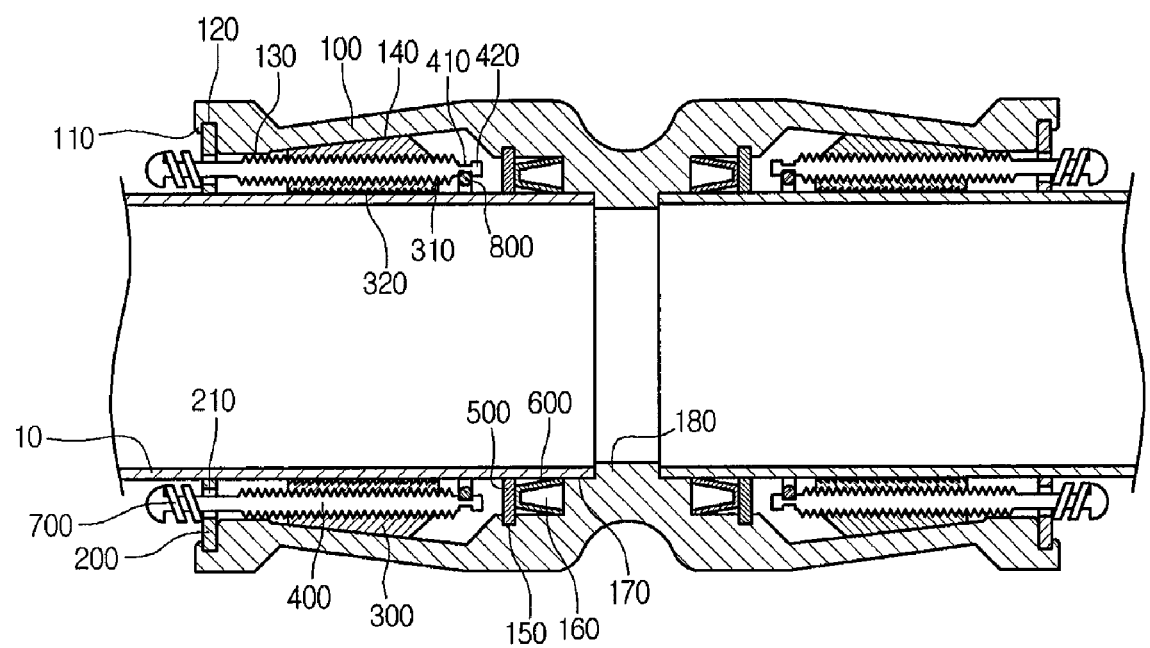

[Figure 11]
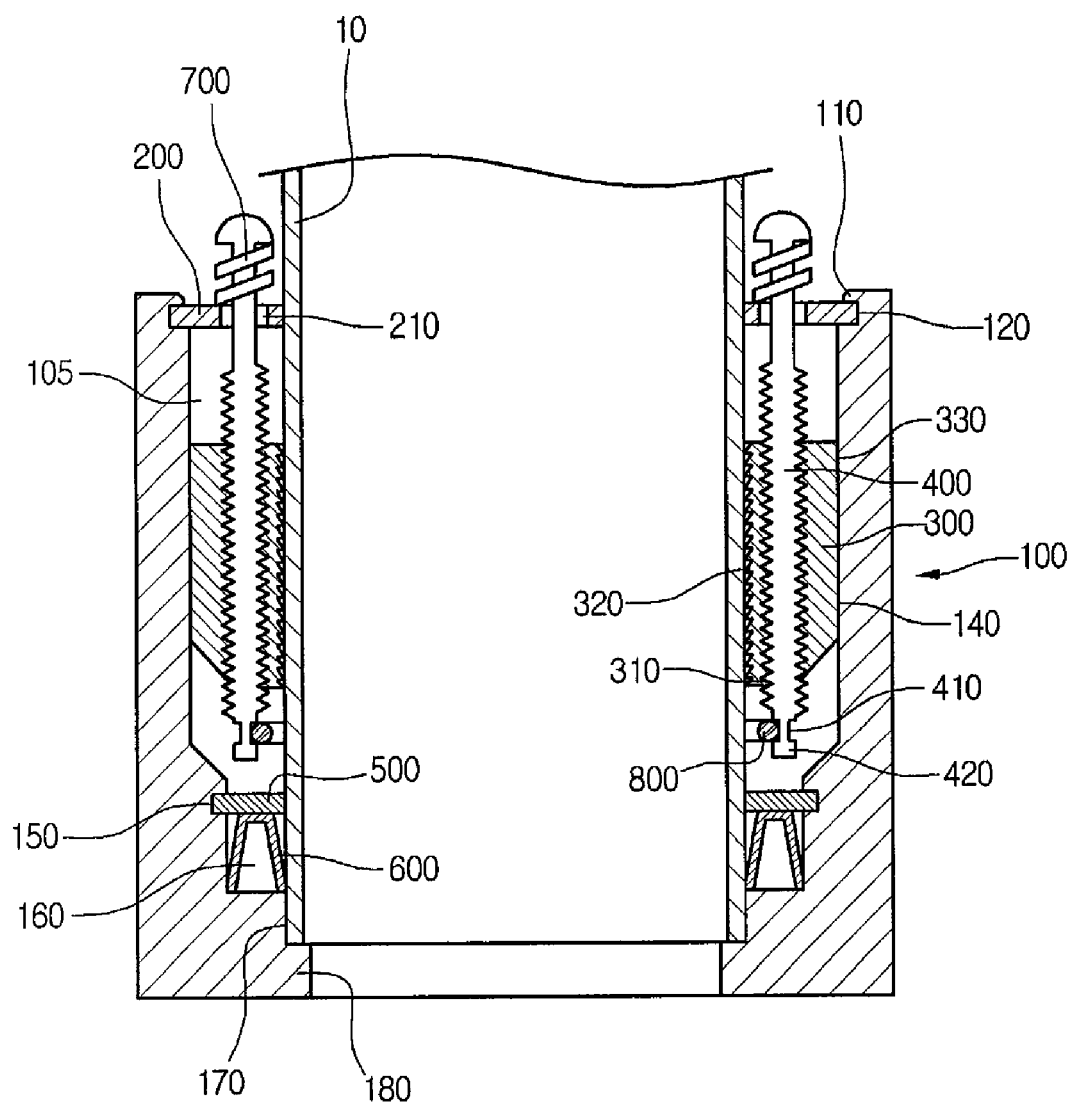

[Figure 12]
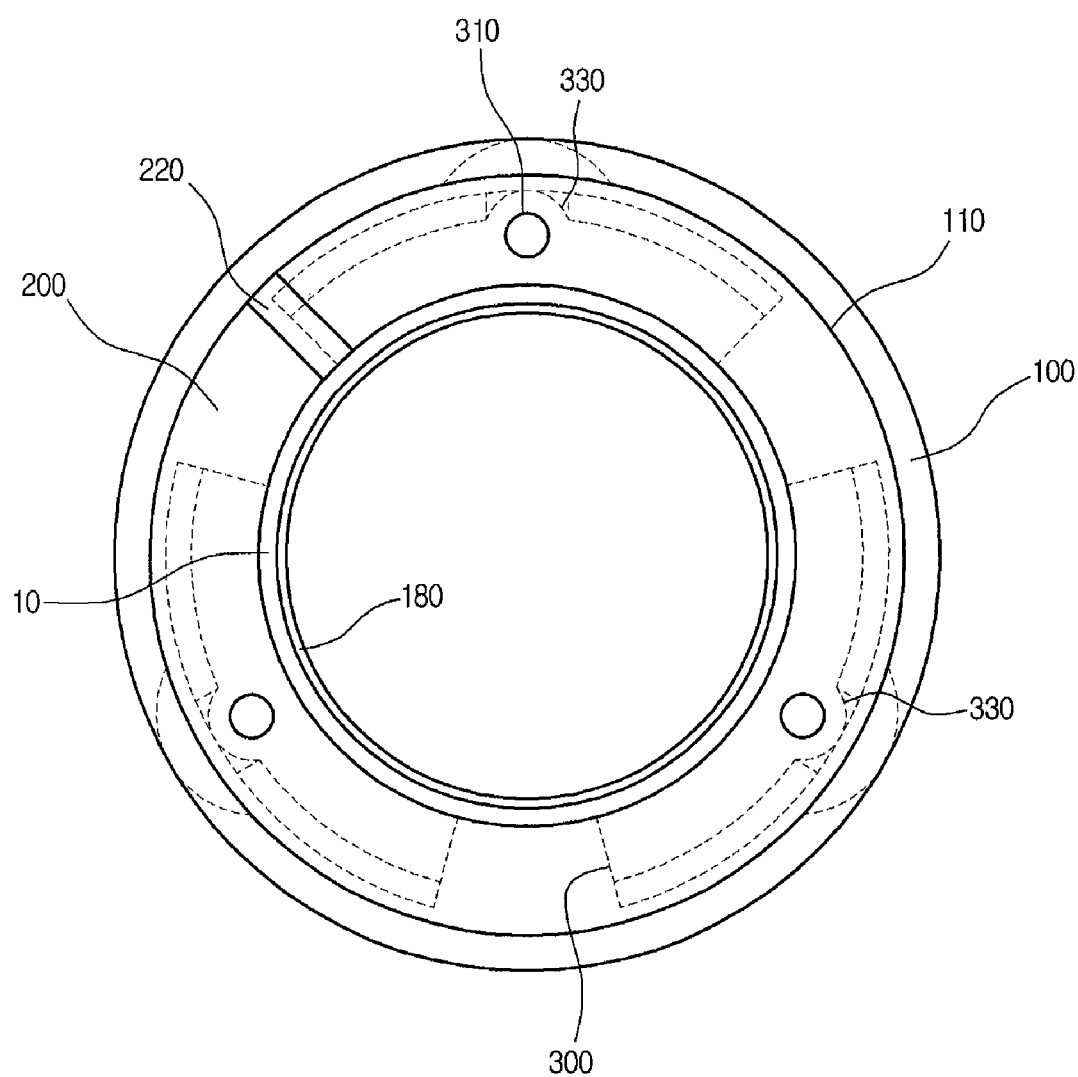

[Figure 13]
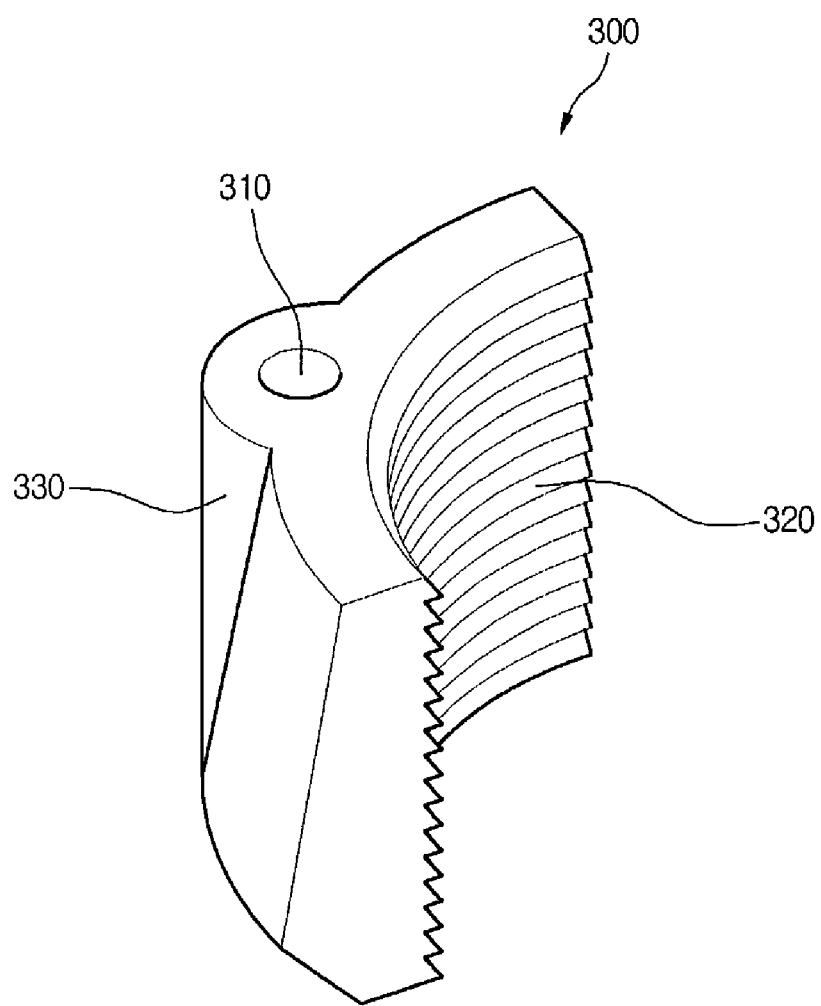

[Figure 14]
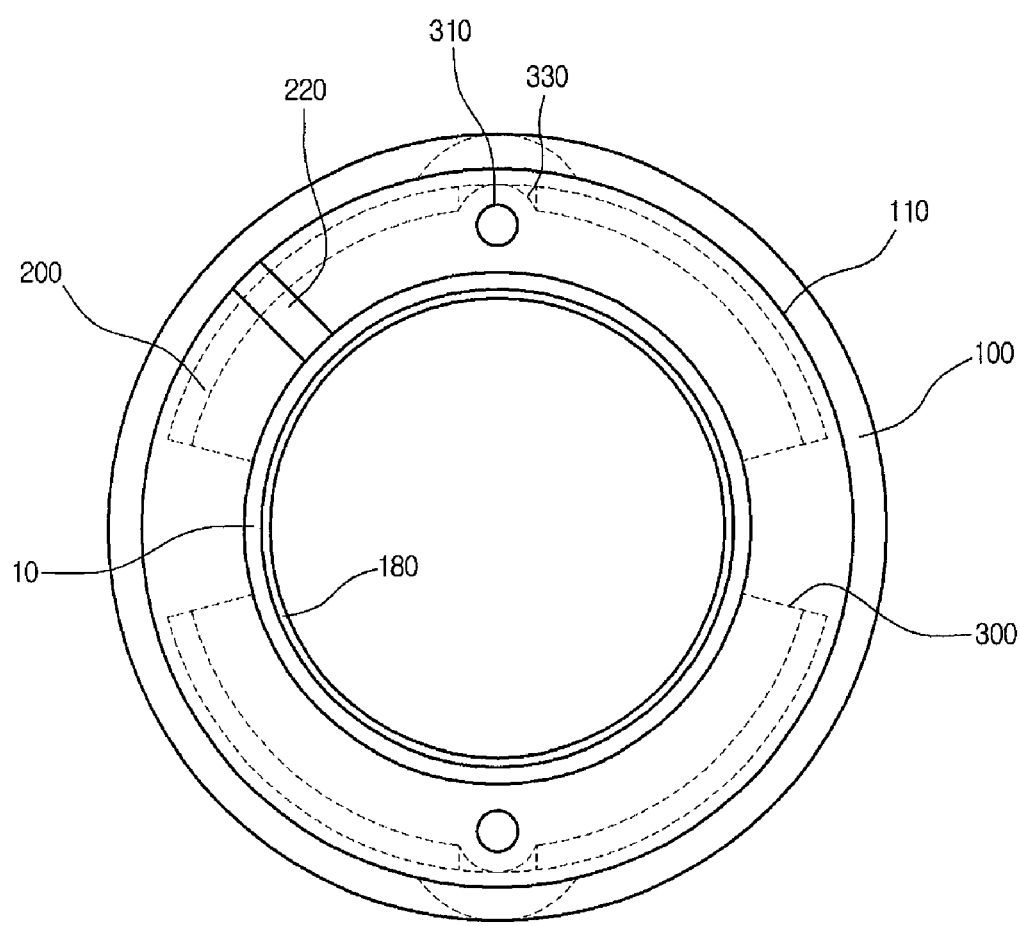

[Figure 15]
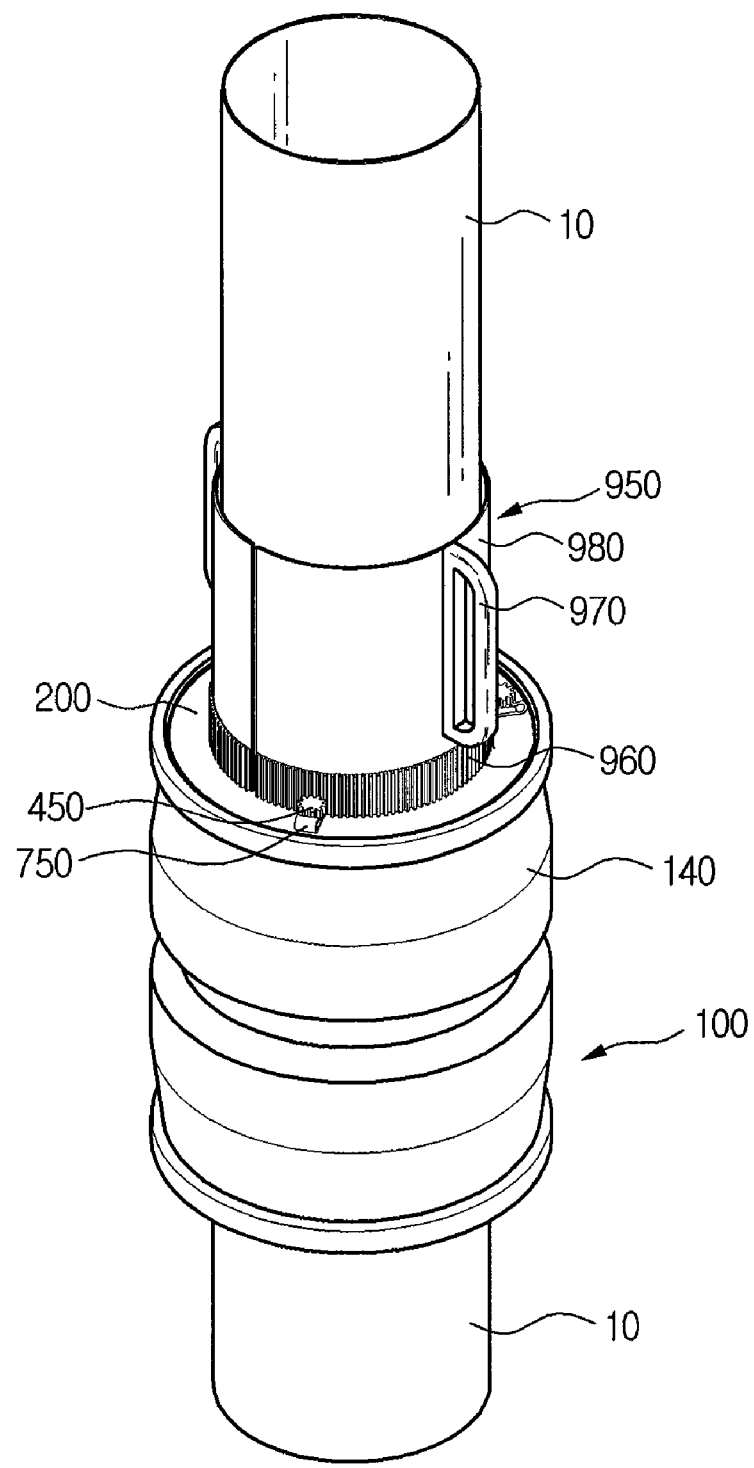

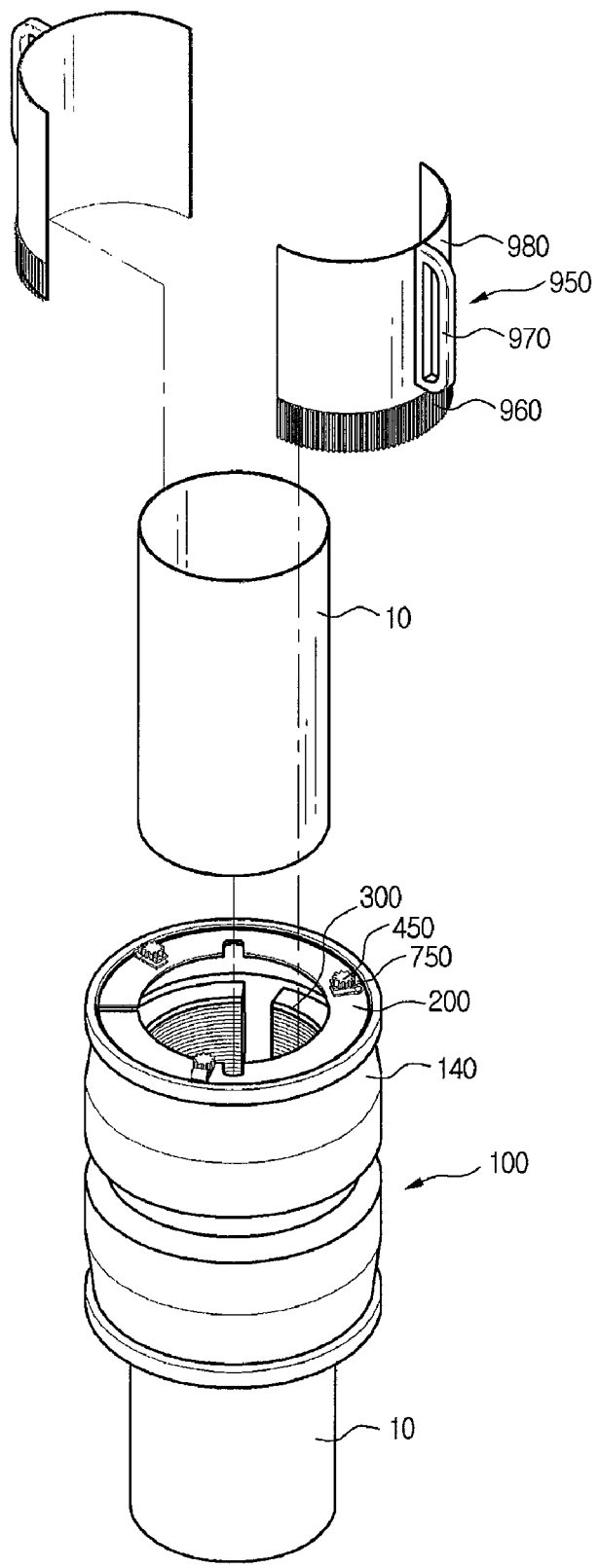
[Figure 16]

[Figure 17]
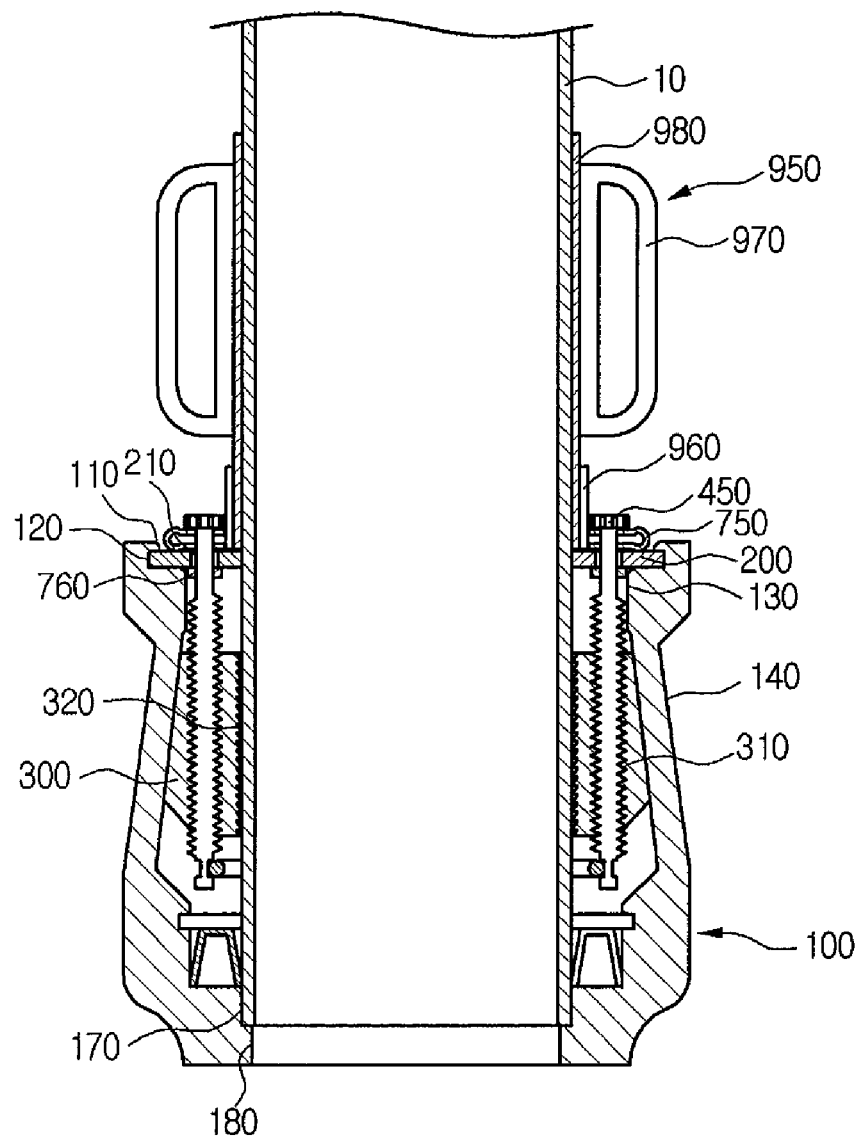

[Figure 18]
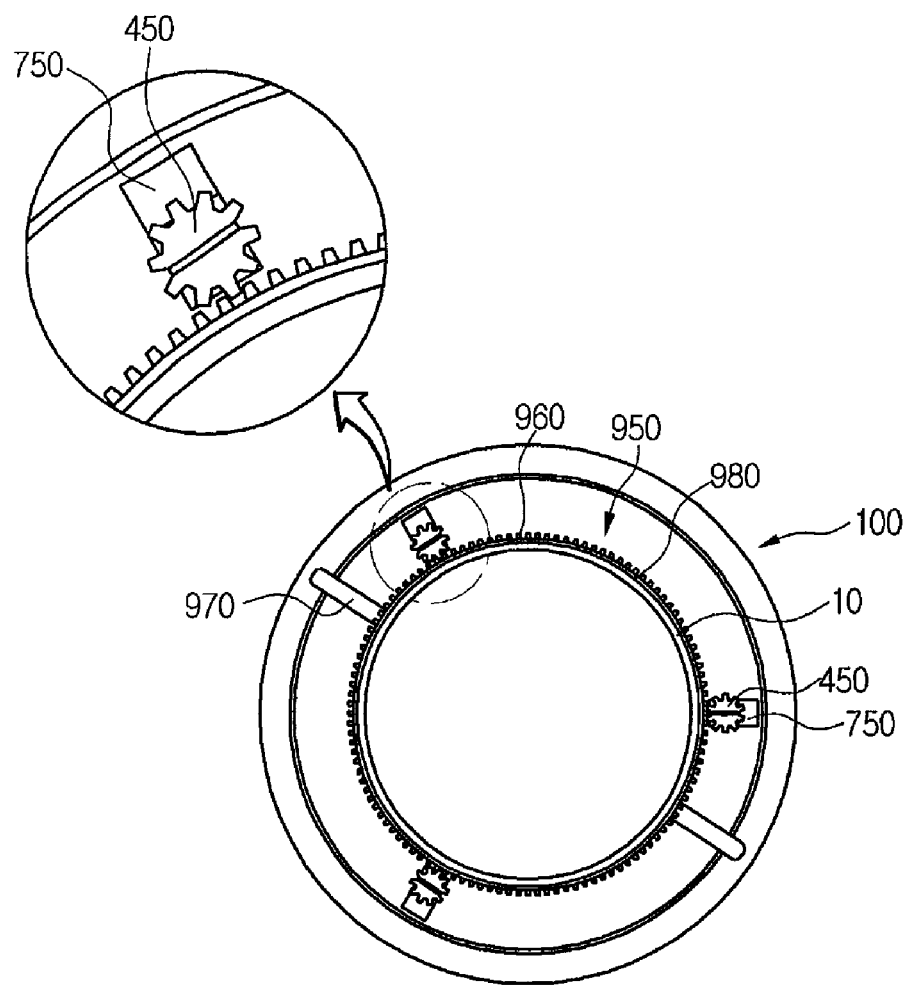

PIPE FIXING SYSTEM AND PIPE FASTENING DEVICE

TECHNICAL FIELD

The invention relates to a pipe fixing system, comprising a cylindrical body having a tapering part inside therein whose diameter is narrower from the bottom to the top and which thus has a sloping inner surface, an entry provided on top of the body and having a bolt hole, a fixing chip provided on the inner side of the tapering part and having a bolt hole extending from the upper part toward the lower part in its center, and a teeth profile on the surface contacting a pipe, and a bolt passing through the bolt hole of the entry and that of the fixing chip, in order to fix the pipe in a secure way and also to connect/disconnect the pipe easily and rapidly.

Also, the invention relates to a pipe fixing system characterized in that the bolt is a gear head bolt, and to a pipe coupling device having a semi-cylindrical body and an external gear on the outer lower part of the body.

BACKGROUND ART

Generally, exemplary structures used by connecting pipes are city water and sewage pipes, gas pipes, street lamp pipes, sign boards, indication plates, etc. Some of electric sign boards, advertisement boards, etc. have the same pipe connection structure. Most of the systems for connecting such structures are made by welding or have a screw structure, which disadvantageously needs in turn a lot of time and labor for connection and disconnection.

Furthermore, most of pipe joints are made by welding or screwing when connecting the pipes. In case of a large pipe, a rubber ring is used to cover the pipe connection, then overly it with a ring-shaped metal to couple it with a bolt. Such a connection method, however, is time and labor consuming work which is annoying in disassembling the structure because the work should be done in a reverse order.

In particular, when installing, maintaining and disassembling a street lamp or a sign board, the work must be done rapidly, and a rapid and robust coupling system is also required when equipping or repairing a large city water or sewage pipe or a gas pipe in an emergency.

In order to meet such a need, there are disclosed inventions or designs of a structure for exerting wedge action on the outer diameter of a pipe for fixing the pipe: Japan Patent Application No. 2001-21076, Korea Utility Model Registration No. 20-0325868 and published Korea Patent Application No. 10-2004-0077623, wherein the structure functions the same as the pipe fixing system according to the invention.

The structure, however, disclosed in the aforementioned Japan Patent No. 2001-21076 has a complicated structure such as a gland, two flanges, a lock ring, an encore, etc. which need a lot of production cost and do not have a good appearance, and may also be damaged during storage, installation and transportation because the parts of bolts and flanges excessively protrude to the outside, unlike the structure according to the invention.

Also, in the utility model disclosed in Korea Utility Model Registration No. 20-0325868, it is very hard to fix a pipe 10 in a secure way because the inner side of the fixing chip 24 contacting the outside of the pipe 10 is produced smooth, as shown in FIG. 1. Since the inlet 23 is integrated with the body 20, the entry (23) of the body (20) may be broken or the pipe (10) may be damaged when tension or torsion is exerted on the pipe (10) while the pipe (10) rests on the guide wall (29) and the stop (21) and is coupled by means of a bolt.

In the invention disclosed in the published Korea Patent No. 10-2004-0077623, a pipe id fixed by means of elasticity of a plate-type spring, but the spring cannot have elasticity enough to fix a pipe whose diameter is more than 100 mm in a secure way.

DISCLOSURE

Technical Problem

In order to solve all of the aforementioned problems, the invention was conceived. It is an object of the invention to provide a pipe fixing system comprising: a cylindrical body having a tapering part which is a sloping surface and whose diameter is smaller as it goes from the bottom to the top; an entry provided in the body and having a bolt hole; a fixing chip provided inside of the tapering part, having, in the center, a bolt hole extending from the top to the bottom and having teeth on the surface contacting the pipe; and a bolt passing through the bolt hole of the entry and that of the fixing chip.

The pipe fixing system configured as described above and according to the invention can exhibit strong wedge action even without additional work such as welding. With the system, it is easy to assemble or disassemble pipes, and it is possible to prevent the pipes and the system from being damaged when tension or distortion is exerted thereon while they are coupled. With the system according to the invention when feeding high-temperature or ultra-low temperature fluid, it is possible to prevent packing and the like from being damaged or deformed.

Also, it is another object of the invention further to provide a pipe fixing system, in which a bolt used in the system is configured to have a gear bolt head and pipes are connected and disconnected by means of pipe coupling device with an external gear on the lower part, with the system according to the invention, it is thus possible to minimize the time for connecting and disconnecting pipes by turning a plurality of bolts at one time, to maximize fixing force, and to exert uniform force on each bolt, so that it is possible to provide a pipe fixing system in which tension or torsion is not exerted on the pipes.

Technical Solution

In order to achieve the aforementioned object of the invention, the pipe fixing system according to the invention is characterized by comprising: a cylindrical body having a tapering part which has a sloping surface and whose diameter is smaller as it goes from the bottom to the top; an entry provided on the upper part of the body and having a bolt hole and a projection; a fixing chip provided inside of the tapering part and having, in the center, a bolt hole extending from the top to the bottom and having teeth on the surface contacting the pipe; and a bolt passing through the bolt hole of the entry and that of the fixing chip.

Also, the invention is characterized in that the body comprises an entrance stop on top of the tapering part for fixing the entry to prevent the entry from being released from the body; an upper insertion groove extending from the entrance stop and in which the entry is provided, a lower insertion groove in which a snap ring is provided on the lower part of the tapering part; a recess on which a packing rests; a guide wall and a bridging stop in which the end of the pipe is inserted and rests.

Furthermore, the invention is characterized in that the body further comprises a snap ring provided in the lower insertion groove on the lower part of the body, and a packing contained in the recess located on the lower part of the snap ring and for achieving air tightness.

The invention is also characterized in that the body comprises an entrance stop on top of the tapering part for fixing the entry to prevent the entry from being released from the body; an upper insertion groove extending from the entrance stop and in which the entry is provided, a guide surface extending from the upper insertion groove; a projection extending from the tapering part on the lower part of the tapering part; a recess on which a packing rests; a guide wall and a stop in which the end of the pipe is inserted and rests.

Furthermore, the invention is characterized in that a packing is further provided, the packing being contained in the recess on the lower part of the projection of the body and being used for achieving air tightness.

Also, the invention is characterized in that a spring washer is inserted between the upper surface of the entry and the bolt head.

Also, the invention is characterized in that a spring recess and a bolt end are provided on the lower part of the bolt to prevent unintentional movement of the bolt and a spring is provided in the spring recess.

Also, the invention is characterized in that the snap ring is inserted in the lower insertion groove of the body, the snap ring having a projection extending upward and the bolt having a contact with an extension from the screw thread side, so that the contact is supported by the projection to prevent bolt movement.

Also, the invention is characterized in that the projection of the snap ring is produced by bending the upper surface of the snap ring.

Also, the invention is characterized in that a bolt fixing recess is provided on the projection of the body, the bolt having a contact with the extension from the screw thread side, so that the extension is inserted in the bolt fixing recess to prevent bolt movement.

Also, the invention is characterized in that the packing is made of Teflon, or metal.

Also, the invention is characterized in that the packing is an o-ring made of rubber or synthetic resin.

Also, the invention is characterized in that the lower surface of the body is provided with a horizontal attaching plate for fixing the body.

Also, the invention is characterized in that the fixing chip has a projection extending from the bottom to the top on the opposite side of the teeth.

Also, the invention is characterized in that the internal side of the body is provided with a vertical recess extending from the top to the bottom correspondingly to the projection of the fixing chip to allow the fixing chip to move upward and downward.

Also, the invention is characterized in that two or three fixing chips are provided in the body.

Also, the invention is characterized in that the body is a symmetrical one block type to insert and fix pipes symmetrically in an opposite direction.

Also, the invention is characterized in that the bolt is a gear head bolt.

Also, the invention is characterized in that a ⊏-shaped spring washer is inserted between the entry and the bolt head.

Also, the invention is characterized in that a stop washer is inserted between the entry and the fixing chip.

Also, the invention is characterized in that the fixing chip is glued and fixed to the tapering part of the body. Also, the invention is characterized in that the pipe coupling device according to the invention consists of a pair of semi-cylindrical bodies and an external gear provided on the external lower part of the body.

Also, the invention is characterized in that a grip is provided in the external center of the semi-cylindrical body.

Advantageous Effects

With the embodiments of the pipe fixing system with an entry and a metal packing according to the invention and configured as described above, it is possible rapidly to connect and disconnect pipes by means of strong wedge action even without any additional work such as welding, possible to prevent noise and damage in storage or installation, and also possible to prevent pipes and the pipe fixing system from being damaged when tension or torsion is exerted while being coupled.

When the packing is made of Teflon, metal, etc. which is selected to be able to withstand high temperature and ultralow temperature, it is possible to prevent the packing and the like from being deformed or damaged when feeding fluid at a high temperature.

Also, the bolt used in the pipe fixing system according to the invention is a gear head bolt and the pipe is connected and disconnected with a pipe coupling device with an external gear on its lower end. Accordingly, it is possible to minimize the time for turning a plurality of bolts to connect and disconnect the pipe at one time. Since the grip provided on the pipe coupling device is turned to fix the pipe, the pipe can be easily fixed manually or automatically, and it is possible to maximize the fixing force. Since uniform force can be exerted on each bolt, tension or torsion is not applied on the pipe to be fixed.

Also, since a ⊏-shaped spring washer is inserted between the gear head bolt and the entry, it is possible to secure even stronger elastic force and to prevent the gear head bolt from being loosened. Since the stop washer is used, the pipe is also protected from being damaged, so that it is possible to use the pipe fixing system according to the invention and the pipe in a more secure way and in a long term.

DESCRIPTION OF DRAWINGS

FIG. 1 is a cross section of a conventional pipe fixing system.

FIG. 2 is a top view of a pipe fixing system according to the invention.

FIG. 3 is a cross section, cut along the line A-A' shown in FIG. 2.

FIG. 4 is a prospective view of a fixing chip in the pipe fixing system according to the invention.

FIG. 5 is a cross section of another embodiment of the pipe fixing system according to the invention.

FIG. 6 is a cross section of still another embodiment of the pipe fixing system according to the invention.

FIG. 7 a cross section of still another embodiment of the pipe fixing system according to the invention.

FIG. 8 is a cross section and a top view of a snap ring of the pipe fixing system according to the invention.

FIG. 9 is a prospective view of another embodiment of the snap ring of the pipe fixing system according to the invention.

FIG. 10 is a cross section of another embodiment of the pipe fixing system according to the invention.

FIG. 11 is a cross section by another embodiment of the fixing chip according to the invention.

FIG. 12 is a top view of FIG. 11.

FIG. 13 is a prospective view showing another embodiment of the fixing chip according to the invention.

FIG. 14 is a top view with two fixing chips in another embodiment according to the invention.

FIG. 15 is a prospective view of the pipe fixing system according to another embodiment of the invention.

FIG. 16 is an exploded prospective view of the system according to the invention, shown in FIG. 15.

FIG. 17 is a partial cross section of the invention shown in FIG. 15.

FIG. 18 is a top view and a partially enlarged view of the invention shown in FIG. 15.

BEST MODE

Hereinafter, the embodiments of the pipe fixing system according to the invention will be described in more detail with reference to the accompanying drawings.

FIG. 2 is a top view of a pipe fixing system according to the invention.

FIG. 3 is a cross section, cut along the line A-A' shown in FIG. 2. FIG. 4 is a prospective view of a fixing chip in the pipe fixing system according to the invention. FIG. 5 is a cross section of another embodiment of the pipe fixing system according to the invention. FIG. 6 is a cross section of still another embodiment of the pipe fixing system according to the invention. FIG. 7 a cross section of still another embodiment of the pipe fixing system according to the invention. FIG. 8 is a cross section and a top view of a snap ring of the pipe fixing system according to the invention. FIG. 9 is a prospective view of another embodiment of the snap ring of the pipe fixing system according to the invention. FIG. 10 is a cross section of another embodiment of the pipe fixing system according to the invention. FIG. 11 is a cross section by another embodiment of the fixing chip according to the invention. FIG. 12 is a top view of FIG. 11. FIG. 13 is a prospective view showing another embodiment of the fixing chip according to the invention. FIG. 14 is a top view with two fixing chips in another embodiment according to the invention. FIG. 15 is a prospective view of the pipe fixing system according to another embodiment of the invention. FIG. 16 is an exploded prospective view of the invention, shown in FIG. 15. FIG. 17 is a partial cross section of the invention shown in FIG. 15. FIG. 18 is a top view and a partially enlarged view of the invention shown in FIG. 15.

The pipe fixing system according to the invention, as shown in FIG. 3, comprises a cylindrical body (100) in which a pipe (10) is inserted, an entry (200) provided in an upper insertion groove (120) on the upper part of the body (100) in which the pipe (10) is inserted, a fixing chip (300) for fixing the pipe (10) in the body (100) in a secure way by means of wedge action, and a bolt passing through the body (100) and the fixing chip (300) for controlling the fixing chip (300) to move up and down. If required, the system according to the invention may further comprise a packing (600) for preventing fluid in the pipe (10) from leaking, and a snap ring (500) provided to prevent the packing (600) from being released.

In case that the snap ring (500) for preventing the packing (600) from being released is not provided, a projection (195) integrated with the body (100) may be provided on the same location as the snap ring (500) in casting the body (100), that is, on the lower part of the tapering part (140) and above the packing (600), as shown in FIG. 7.

The body (20) has, on the upper part thereof, a hollow in which the pipe (10) is inserted, around which there are provided the upper insertion groove (120) and the entrance stop (110) in which the entry (200) is provided, as show in FIGS. 2 and 3.

There is provided a guide surface (130) in a straight line extending towards the lower part of the body (100) from the upper insertion groove (120) and the entrance stop (110). The tapering part (140) is integrated with the body, the part (140) being a sloping surface having a wider downward from the lower part of the guide surface (130).

There is provided a stop (180) on the lower inside of the body (100). On top of the stop (180), there is provided a guide wall (170) for vertically guiding the pipe (10) when inserting the pipe (10) and for allowing the outer surface of the pipe (10) to closely contact and thus fixing the pipe (10) when fixing the pipe (10).

On top of the guide wall (170), there are provided in succession a recess (160) in which the packing (600) is provided and a lower insertion groove (150) in which the snap ring (500) is provided.

As shown in FIG. 7, it is possible to provide the body (100) with a projection (195) and accept a packing (601) without providing the snap ring (500), in order to provide the recess (160) in which the packing (601) is provided on top of the guide wall (170). In this case, it is preferred that the packing (601) is of an o-ring made of rubber or synthetic resin.

The body (100) of the pipe fixing system according to the invention configured as described above has a structure that the inside of the body (100) of the pipe fixing system according to the invention configured as described above is open and spread while the pipe (10), the fixing chip (300) and the bolt (400) are removed, e.g., the internal surface of the guide surface (130), the internal surface of the tapering part (140) and the upper surface of the stop (180) form a space.

Also there are provided an entrance stop (110) and an upper insertion groove (120) on top of the body (100). The entry (200) is inserted in and fixed to the upper insertion groove (120). The entrance stop (110) prevents the entry from being released, but is made to slightly overlap the upper part of the entry (200) as shown in FIG. 3, so that it can be released to the outside of the body (100) when strong tension is exerted on the pipe (10). With the structure, although it is released to the outside, the pipe (10) is fixed even more rigidly despite strong tensile force exerted from the outside, which action will be described in detail in the coupling process herein below.

As seen in FIG. 3, when the entry (200) is of an integrated ring shape, the outer diameter of the entry (200) must be larger than the circumference of the entrance stop (110). Therefore, with the structure, it is impossible to insert the entry (200) in the upper insertion groove (120). To settle the problem, there is provided a projection (220) for cutting a part of the entry (200). When inserting the entry (200) in the upper insertion groove (120), both ends of the bolt of the projection (220) are crossed each other to make the outer diameter smaller, so that the entry (200) keeps a circle shape by means of the elastic force when inserted in the upper insertion groove (120) to complete the coupling process.

In the body (100), a fixing chip (300) is provided to fix the outer surface of the pipe (10) in a secure way. The fixing chip (300) is designed to have a wider bottom and narrower top as shown in FIG. 4. Therefore, the internal surface of the fixing chip (300) can rise or fall along the outer surface of the pipe (10), and the outer surface thereof can rise or fall along the sloping surface of the tapering part (140). It is made that the bolt (400) described hereinbelow can pass through the upper and the lower sides of the fixing chip (300), while the bolt hole (310) is provided in the center of top and bottom of the fixing chip (300).

Since on the internal surface of the fixing chip (300), there are provided teeth (320) which contact the pipe (10) and thereby achieve strong wedge action, the fixing chip (300) according to the invention enhances coupling force to the pipe (10) even more as compared to a conventional fixing chip without any teeth.

In order to allow the fixing chip (300) to rise or fall along the sloping surface of the tapering part (140) on the internal surface of the pipe (10), the bolt (400) is coupled which passes through the bolt hole (210) of the entry (200) from the outside of the body (100). The bolt (400) which passes through the bolt hole (210) is coupled to the screw provided in the bolt hole (310) of the fixing chip (300).

Here, it is preferred to provide three fixing chips (300) for a stable structure, but it is allowable to provide only two fixing chips (300) when the diameter of the pipe is not larger than 30 mm. If the horizontal cross section of the fixing chip (300) is long to the right and left, it is preferred to provide two bolt holes (not shown) for coupling by means of use two bolts (400) because the fixing chip (300) may swing to the right and left and may be unstable when tightening or loosening the bolt (400). Another embodiment of the fixing chip (300) is shown in FIGS. 11 to 14.

There is provided a projection (330) extending upward and downward on the opposite side to the side with the teen (320) of the fixing chip (300). On the internal surface of the body (100), there is provided a vertical groove (105) corresponding to the projection (330) of the fixing chip (300), extending upward and downward. Accordingly, the fixing chip (300) is inserted in the vertical groove (105), so that the fixing chip (300) has a structure that it can move up and down along the vertical groove (105) and the fixing chip (300) does not swing to the right or left. When the pipe (10) is fixed to the body (100), the fixing chip (300) is balanced and achieves wedge action at the same time, so that the pipe (10) is stably coupled and coupling force is thus enhanced even more.

Accordingly, since the fixing chip (300) has a larger area for having the bolt hole (310) because of the projection (330), the size can be larger when the bolt hole (310) is provided in the center. Accordingly, since the diameter of the bolt (400) to be used can be larger, it is possible to improve stability and coupling force between the fixing chip (300) and the entry (200) only with one bolt hole (310) and one bolt (400), resulting in even more stable coupling.

Also, while fluid flows through the pipe fixing system according to the invention, there is a possibility that the fluid in the pipe may flow into the body (100) through a small gap, e.g., the stop (180) and then flow out of the pipe fixing system. To eliminate such a possibility, as shown in FIG. 3, it is desirable to provide the packing (600) in the recess (160) located on the lower part of the body (100). In this case, it is possible to ensure air tightness by providing the snap ring (500) in the lower insertion groove (150) located in outer side of the body (100) and accepting the packing (600) on the lower end. Instead of the snap ring (500), it is possible to provide the projection (195) as shown in FIG. 7 and described above.

Here, in general, the packing (600) is made of rubber which has a large elastic force, but it is preferred that it is made of Teflon or metal that can withstand a high or ultra-low temperature of the fluid fed through the pipe (10).

When Teflon or metal is employed as a material for the packing (600), Teflon or metal has a very small elastic force. Therefore, as seen from the comparison in FIGS. 1 and 3, it is almost impossible to insert the packing (600) in the recess (160) on the lower part of the body (100) when the entry (200) is not provided on top of the body (100) and thus integrated with the body (100). Therefore, the entry (200) and the packing (600) have mutually close relationship in the configuration.

Also, when the snap ring (500) is not provided on top of the packing (600) and the projection (195) is provided, it is also impossible to insert the packing made of Teflon or metal (600) in the recess (160). In this case, an o-ring made of rubber or synthetic resin is used as a packing (601).

That is, as shown in FIG. 7, when the projection (195) is provided instead of the snap ring (500) to accept the packing (600), the rubber o-ring (601) with large elastic force is used so that the packing (600) is bent to pass through the inner surface of the projection (195).

When transporting or installing the pipe fixing system according to the invention, the fixing chip (300) or the bolt (400) may hit the body (100) thus to produce noise or be damaged.

To address such a problem, as shown in FIGS. 3 and 5, a spring recess (410) is provided on the lower part of the bolt (400) to insert a spring (800) in the spring recess (410) and thus to prevent movement of the bolt (400) or the fixing chip (300).

Here, in another embodiment to prevent movement of the bolt (400) or the fixing chip (300), as shown in FIG. 6, the snap ring (510) with a projection (511) is inserted in the lower insertion groove (150) provided on the lower part of the body (100).

As shown in FIG. 8, the snap ring (500) is a coil snap ring (500) of plate type, unlike the entry (200) described hereinbefore, so that it can be inserted easily in the lower insertion groove (150). As shown in FIG. 9, another type of a snap ring (510) having a projection (511) to prevent movement is made by bending the upper surface of the snap ring (510) to put the contact (440) provided on the extension (430) of the bolt (400).

The projection (511) is produced by bending the outside toward the inside of the snap ring (510) as much as a given width. When inserting the fixing chip (300) and the bolt (400) in the body (100), the extension (430) of the bolt (400) might be more or less free on the outside of the projection (511). However, when the bolt (400) is thereafter tightened to fix the pipe (10), the fixing chip (300) and the bolt (400) gradually move towards the center of the pipe (10) and the contact (440) provided on the extension (430) of the bolt (400) gradually approaches the projection (511). Accordingly, after completing the process of coupling the pipe (10), the contact (440) provided on the extension (430) of the bolt (400) is inserted tightly in the projection (511) to prevent movement of the bolt (400).

Of course, the bolt (400), as shown in FIG. 6, has the extension (430) extending from the screw thread surface, the extension (430) having the contact (440) at its end. It is desirable that the extension (430) is produced to be longer than a given length so that it can have elastic force when contacting the projection (511) provided on the snap ring (510). It is also desirable that the contact (440) is spaced with the snap ring (510) by approximately 2 mm, considering the compression length of the entry (200) and the spring washer (700) which have elastic force as described above.

Referring to still another embodiment of the invention to prevent movement of the bolt (400) and the fixing chip (300), as shown in FIG. 7, the projection (195) is provided to be integrated with the body (100), at the same location as the snap ring (500), e.g., at the end of the part narrowing towards the lower part of the tapering part (140), when casting the body (100). Subsequently, a bolt fixing recess (195a) is provided on the projection (195) for inserting the extension (430)

of the bolt (400) and the extension (430) of the bolt (400) is then inserted to prevent movement of the bolt (400).

It is preferred that the spring washer (700) is inserted between the upper surface of the entry (200) and the bolt (400) head, and the bolt (400) is then coupled. As a result, it is possible to ensure elastic force of approximately 1 mm by the insertion of the spring washer (700) and of approximately 0.5 mm by the installation of the entry (200), when tensile force is exerted on the pipe after inserting the pipe (10) in the pipe fixing system according to the invention.

Hereinafter, the process of coupling and uncoupling the pipe (10) to/from the pipe fixing system according to the invention will be described in detail.

First, the entry (200) is fixed to the upper insertion groove (120) of the body (100) of the pipe fixing system. While the fixing chip (300) is loosely coupled to the body (100) by means of the bolt (400), it grasps the pipe (10) to be fixed. Then the pipe (10) is closely inserted in the hollow in the center of the body (100), so that the pipe (10) contacts the internal surface of the entry (200) provided on top of the body (100) and is inserted in the body while sliding. When the pipe passes the guide wall (170) on top of the stop (180) and reaches the stop (180), the pipe (10) cannot be inserted any more and is fixed by means of contact with the entry (200), the guide wall (170) and the stop (180) to be fixed.

As described above, however, the pipe (10) fixed by means of contact with the entry (200), the guide wall (170) and the stop (180) is not secure enough to withstand tensile force or other external force. When the fixing chip (300) coupled to the inside of the body (100) by means of the bolt (400) is tightened by turning the bolt (400), the fixing chip (300) rises towards the entry (200), and the fixing chip (300) achieves wedge action between the tapering part (140) and the pipe (10), so that it is possible to fix the pipe (10) in a secure way.

That is, when tightening the bolt (400) starts while the pipe (10) is inserted in and fixed to the inside of the body (100), the bolt (400) turns in the tightening direction and the fixing chip (300) rises while the outer surface of the fixing chip (300) contacts the internal sloping surface of the tapering part (140).

In this case, as the fixing chip (300) rises, the outer surface of the fixing chip (300) rises while sliding on the sloping surface of the tapering part (140). As the internal surface of the fixing chip (300) moves in the central direction of the pipe (10), so that the fixing chip (300) tightens the outer surface of the pipe (10) more and more.

That is, as the bolt (400) is tightened, the fixing chip (300) rises, so that the fixing chip (300) is inserted between the sloping surface of the tapering part (140) and the outer surface of the pipe (10) to achieve strong wedge action.

Subsequently, when tightening the bolt (400) stops after the pipe (10) is fixed in a secure way by means of the wedge action of the fixing chip (300), the pipe (10), the fixing chip (300) and the body (100) are integrated to complete the coupling process of the pipe fixing system according to the invention.

On the other hand, in order to uncouple the pipe (10) from the pipe fixing system according to the invention, the reverse process to the coupling process is carried out. By loosening the bolt (400) to pull down the fixing chip (300), the fixing chip (300) releases wedge action to allow easy uncoupling of the pipe (10).

Also, if the bolt end (420) of the bolt (400) reaches the lower part of the tapering part (140), the fixing chip (300) would be fixed more stably, As described above, it is possible to achieve structural stability by installing the spring (800) in the spring recess (410) provided on the lower end of the bolt (400), the lower end of the bolt (400) protruding at the lower part of the fixing chip (300), or by providing the projection (195) to install a snap ring (610) of different type in a different shape, in order to prevent bolt loosening, noise or damage.

As disclosed in the design disclosed in Korea Registration Utility Model No. 20-0325868 as seem above, when the top of the body (100) is unified without the entry, the inlet (23) of the body (20) may be damaged or the pipe might be broken when tension or torsion is exerted on the pipe (10) while the pipe (10) is coupled.

With the pipe fixing system according to the invention, however, the upper insertion groove (120) is provided with and fixed to the entry (200) and the entrance stop (110) slightly overlaps the upper part of the entry (200), as shown in FIG. 3. Therefore, the pipe fixing system according to the invention has a structure that, when strong tensile force is exerted on the pipe (10), the entry (200) is released from the outside of the body (100). With the structure, although the entry (200) is released to the outside, the pipe (10) is kept fixed in a more secure way despite the strong tensile force exerted from the outside.

That is, when strong tensile force is exerted on the pipe (10), the fixing chip (300) acts as a even stronger wedge on the upper part of the tapering part (140) or the guide surface (130) however strong the tensile force exerted on the pipe is, as long as there are provided the upper part of the tapering part and the guide surface (130) extending therefrom. Also, there is no risk of the body (100) or pipe (10) damage or breakage, as in the conventional technologies.

Also, the pipe fixing system according to the invention can be attached on a concrete floor or wall by means of a coupling device such as bolt, etc., by coupling the lower surface of the body (100) to an attaching plate (900), and drilling a plurality of holes (901), as shown in FIG. 5.

The pipe fixing system according to the invention can be used as a joint for a large pipe by extending the lower part of the body (100) to make the pipe insertion direction be opposite and to implement a symmetrically unified system.

In the pipe fixing system according to the invention, it is possible to produce the system by bringing two or more bases into contact to be integrated, so that a pipe connecting system various in its shape can be produced depending on corresponding use and status such as an "L" shape or "T" shape as well as "I" shape, which can be easily derived from the technical spirit of the invention.

FIGS. 15 to 18 illustrate another embodiment of the pipe fixing system according to the invention. The embodiment is characterized in that the bolt (400) for controlling the fixing chip (300) to move up and down is a gear head bolt (450) to allow the bolt (450) to be easily tightened and loosened.

If described in more detail, there is provided a hollow in which the pipe (10) is inserted on the upper part of the body (100). Around the hollow, there are provided the upper insertion groove (120) and the entrance stop (110) in which the entry (200) is inserted.

Also, there is provided a straight-lined guide surface (130) extending from the upper insertion groove (120) and the entrance stop (110) towards the lower part of the body (100). The tapering part (140) is integrated therewith, which widens downward from the end of the guide surface (130) to produce a sloping surface.

And, there is provided a fixing chip (300) in the body (100) in order to fix the pipe (10) in a secure manner. The fixing chip (300) is designed to have a wider lower bottom and a narrower top. With the structure, the internal surface of the fixing chip (300) can move up or down along the pipe (10) and its outer surface can move up or down along the internal sloping surface of the tapering part (140). There is provided a bolt hole (310) in the upper and lower center to allow the gear head bolt (450) to pass through the top and bottom of the fixing chip (300).

There are provided teeth (320) on the internal surface of the fixing chip (300) for achieving strong wedge action by contacting the pipe (10), in order to enhance coupling force with the pipe (10). The gear head bolt (450) passes through the bolt hole (210) of the entry (200) from the outside of the body and is then coupled to the bolt hole (310) of the entry (200), in order to allow the fixing chip (300) to move up and down along the pipe (10).

In this case, since the fixing chip (300) swings in the body (100) to the right and left, the pipe (10) may be coupled while the fixing chip (300) is twisted when the pipe gets fixed. Accordingly, the pipe (10) may not be fixed right and tension or torsion may thus be exerted on the pipe (10). Therefore, it is desirable that the fixing chip (300) is attached to the tapering part (140) in the body, with adhesive, and then detached when the pipe (10) is coupled by turning the gear head bolt (450), in order to perfectly fix the pipe (10). Also, it is desirable to provide three fixing chips (300) and gear head bolts (450) respectively, for a stable structure, but allowable to provide two of them if the diameter of the pipe (10) is not bigger than 30 mm.

It is preferred to insert a spring washer (750) between the upper part of the entry (200) and the gear head bolt (450) to couple the gear head bolt (450). As a result of producing and testing the pipe fixing system according to the invention, the applicant could see that, when tensile force is exerted on the pipe (10), it was possible to ensure elastic force of approximately 3 mm by inserting the spring washer (750) and approximately 0.5 mm by providing the entry (200). In this case, it is preferred that the spring washer (750) is ⊏-shaped in order to ensure stronger elastic force and to prevent the gear head bolt (450) from being loosened.

It is also preferred to insert a stop washer (760) between the entry (200) and the fixing chip (300) in order to prevent the fixing chip (300) from being raised more than required, causing deformation of the pipe (10).

Next, the pipe coupling device (950) according to the invention consists of a pair of semi-cylindrical bodies (980) and an external gear (960) provided on the outer lower end of the body (980).

More particularly, the pipe coupling device (950) is a tool for coupling the pipe (10) to the pipe fixing system according to the invention for which the gear head bolt (450) as described above is provided. The external gear (960) on the external lower end of the semi-cylindrical body (980) is provided to correspond to the gear of the gear head bolt (450) of the pipe fixing system.

As will be described in the following, when the pipe (10) is inserted in the pipe fixing system and the pipe coupling device is then inserted in the space between the gear head bolt (450) and the pipe (10) and turned, the pipe (10) is fixed while the fixing chip (300) rises towards the entry (200) and the gear bolt head (450) thus turns. If the pipe (10) to be fixed is long, it is not easy to insert the pipe coupling device (950). Therefore, two semi-cylindrical bodies (980) are produced for being inserted from the side.

Also, it is preferred that, in the outer center of the semi-cylindrical body (980), there is provided a grip (970) so that it is easy to install and turn the pipe coupling device (950).

Now, the process for connecting and disconnecting the pipe (10) with the pipe fixing system and the pipe coupling device (950) according to another embodiment of the invention will be described in detail, with reference to FIGS. 15 to 18.

First, the entry (200) is fixed in the upper insertion groove (120) of the body (100) of the pipe fixing system. While the fixing chip (300) is loosely coupled to the body (100) by means of the gear head bolt (450) then to hold the pipe (10) to be fixed, the pipe (10) is then inserted close to the hollow in the center of the body (100). Then, the pipe (10) contacts the internal surface of the entry (200) on the upper part of the body (100) and is inserted while sliding. When the pipe (10) passes the guide wall (170) on the upper part of the stop (180) and reaches the stop (180), the pipe (10) cannot be inserted farther and thus fixed, by means of contact with the entry (200), the guide wall (170) and the stop (180).

However, the pipe (10) fixed by means of contact with the entry (200), the guide wall (170) and the stop (180) is not strong enough to withstand tensile force or other external force. Therefore, the pipe coupling device (950) is placed between the gear head bolt (450) and the pipe (10). The gear of the gear head bolt (450) is inserted to be engaged with the external gear (960) provided on the outer lower end of the body (980) of the pipe coupling device (950). Then turning the grip (970) provided on the outer center of the body (980) clockwise results in the gear head bolt's turning to cause the fixing chip (300) to rise towards the entry (200). The fixing chip (300) in turn achieves wedge action between the tapering part (140) and the pipe (10) to fix the pipe (10) in a secure way.

That is, when the pipe coupling device (950) is coupled and the grip (970) is turned clockwise while the pipe (10) is inserted in the body (100) and fixed to the inside thereof, two or three gear head bolts (450) are tightened at the same time, while the outer surface of the fixing chip (300) coupled to the gear head bolt (450) contacts the internal sloping surface of the tapering part (140) and rises.

In this case, as the fixing chip (300) rises, the outer surface of the fixing chip (300) slides on the sloping surface of the tapering part (140) and rises, and the internal surface of the fixing chip (300) moves in the central direction of the pipe (10) to tighten the outer surface of the pipe (10) increasingly stronger.

That is, as two or three gear head bolts (450) are tightened at the same time, the fixing chip (300) rises at the same speed, so that it is inserted between the sloping surface of the tapering part (140) and the pipe (10) to achieve strong wedge action. Since two or three fixing chips (300) can be placed at the same position, unbalanced external force such as torsion is not exerted on the pipe (10).

In this case, the stop washer (760) provided between the entry (200) and the fixing chip (300) acts to prevent the fixing chip (300) from rising towards the entry (200) and prevents the pipe from being damaged by means of exerted excessive force.

Then, after fixing the pipe (10) in a secure way by means of wedge action by the fixing chip (300), turning the grip (970) of the pipe coupling device is inhibited and the pipe coupling device (950) is uncoupled. The pipe (10), the fixing chip (300) and the body (100) are then integrated to complete the coupling process of the pipe fixing system according to the invention.

When uncoupling the pipe (10) from the pipe fixing system according to the invention, the reverse process to the coupling process is carried out. That is, the pipe coupling device (950) is positioned between the gear head bolt (450) and the pipe (10) and inserted so that the gear of the gear head bolt (450) is engaged with the external gear (960) on the external lower end of the body (980) of the pipe coupling device (950). When the grip (970) on the outer center of the body (980) is then turned anticlockwise to turn the gear head bolt (450). The fixing chip (300) moves down while the gear head bolt (450) turns, and the fixing chip (300) releases wedge action easily to uncouple the pipe (10).

It should be noted by those skilled in the art that the above embodiments illustrate the most preferred examples of the invention, but the invention is not limited to those embodiments and various modifications can be made within the scope of the invention, without departing from the technical spirit of the invention.

INDUSTRIAL APPLICABILITY

The pipe fixing system according to the invention relates to comprises a cylindrical body having a tapering part therein whose diameter is narrower towards the upper part and thus which has a sloping inner surface, an entry provided on top of the body and having a bolt hole, a fixing chip provided on the inner side of the tapering part and having a bolt hole extending from the upper part toward the lower part in its center, and teeth on the surface contacting a pipe, and a bolt passing through the bolt hole of the entry and that of the fixing chip, in order to fix the pipe and also to connect/disconnect the pipe easily and rapidly.

Also, the invention relates to a pipe fixing system in which the bolt is a gear head bolt, and to a pipe coupling device comprising semi-cylindrical bodies and an external gear provided on the outer lower end of the body.

The invention claimed is:

1. A pipe fixing system, comprising:
   a cylindrical body having a tapering part whose diameter is smaller as it goes towards the top of the body;
   an entry provided in the body and having a bolt hole and a projection;
   a fixing chip provided in the tapering part, having, in the center, a bolt hole extending from the top to the bottom of the chip and having teeth on an inner surface contacting a pipe; and
   a bolt passing through the bolt hole of the entry and that of the fixing chip,
   wherein a spring recess and a bolt end are provided on the lower part of the bolt and a spring is provided in the spring recess to prevent unintentional movement of the bolt.

2. The system as claimed in claim 1, the body comprises:
   an entrance stop above the tapering part for fixing the entry to prevent the entry from being released from the body;
   an upper insertion groove extending from the entrance stop and in which the entry is inserted;
   a guide surface extending from the upper insertion groove;
   a lower insertion groove in which a snap ring is provided below the tapering part;
   a recess on which a packing rests;
   a guide wall and a stop in which the end of the pipe is inserted and rests.

3. The system as claimed in claim 2, characterized in that the packing is made of metal.

4. The system as claimed in claim 2, characterized in that the packing is an o-ring made of rubber or synthetic resin.

5. The system as claimed in claim 1, characterized in that a spring washer is inserted between the upper surface of the entry and the head of the bolt.

6. The system as claimed in claim 1, characterized in that the bottom of the body is provided with a horizontal attaching plate for fixing the body.

7. The system as claimed in claim 1, characterized in that the fixing chip is provided with a projection on the side opposite the teeth.

8. The system as claimed in claim 1, characterized in that the interior of the body is provided with a vertical recess corresponding to a projection of the fixing chip to allow the fixing chip to move up and down.

9. The system as claimed in claim 1, characterized in that two or three fixing chips are provided in the body.

10. The system as claimed in claim 9, characterized in that the body is symmetrical so as to permit a pipe to be inserted and fixed in each end of the body.

\* \* \* \* \*